(12) United States Patent
Zheng et al.

(10) Patent No.: US 10,664,659 B2
(45) Date of Patent: *May 26, 2020

(54) METHOD FOR MODIFYING SEGMENTATION MODEL BASED ON ARTIFICIAL INTELLIGENCE, DEVICE AND STORAGE MEDIUM

(71) Applicant: BEIJING BAIDU NETCOM SCIENCE AND TECHNOLOGY CO., LTD., Beijing (CN)

(72) Inventors: Liqun Zheng, Beijing (CN); Jinbo Zhan, Beijing (CN); Qiugen Xiao, Beijing (CN); Zhihong Fu, Beijing (CN); Jingzhou He, Beijing (CN); Guyue Zhou, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 182 days.

This patent is subject to a terminal disclaimer.

(21) Appl. No.: 15/934,496

(22) Filed: Mar. 23, 2018

(65) Prior Publication Data

US 2018/0365208 A1 Dec. 20, 2018

(30) Foreign Application Priority Data

Jun. 14, 2017 (CN) .......................... 2017 1 0449945

(51) Int. Cl.
*G06F 40/284* (2020.01)
*G06N 3/08* (2006.01)
(Continued)

(52) U.S. Cl.
CPC .......... *G06F 40/284* (2020.01); *G06F 40/242* (2020.01); *G06N 3/04* (2013.01); *G06N 3/08* (2013.01); *G06N 3/088* (2013.01)

(58) Field of Classification Search
CPC ...... G06F 17/277; G06F 17/2735; G06N 3/04; G06N 3/08; G06N 3/088
See application file for complete search history.

(56) References Cited

U.S. PATENT DOCUMENTS 10,467,342 B2* 11/2019 Lu ........................... G06F 16/36
2013/0204606 A1 8/2013 Zong
(Continued)

FOREIGN PATENT DOCUMENTS

| CN | 101930561 | 12/2010 |
|---|---|---|
| CN | 103077164 | 5/2013 |

(Continued)

OTHER PUBLICATIONS

Gated Recursive Neural Network for Chinese Word Segmentation, Jul. 26-31, 2015 Xinchi Chen, Xipeng Qiu*, Chenxi Zhu, Xuanjing Huang Shanghai Key Laboratory of Intelligent Information Processing, Fudan Universi,Proceedings of the 53rd Annual Meeting of the Asso.*

(Continued)

*Primary Examiner* — Mohammad K Islam
(74) *Attorney, Agent, or Firm* — Hodgson Russ LLP

(57) ABSTRACT

Embodiments of the present disclosure disclose a method for modifying a segmentation model based on artificial intelligence, a device and a storage medium. The method may include: acquiring a model parameter of the segmentation model, and performing a training on a feature vector corresponding to a preset generalized feature of a first training corpus via a neural network so as to acquire a model parameter of the preset generalized feature; performing a word segmentation on the first training corpus according to the model parameter of the segmentation model and the model parameter of the preset generalized feature, so as to acquire a segmentation result; and comparing the segmentation result with the first training corpus according to a (Continued)

preset rule, and modifying the model parameter of the segmentation model and a parameter of the neural network according to a comparison result.

18 Claims, 4 Drawing Sheets

(51) Int. Cl.
*G06N 3/04* (2006.01)
*G06F 40/242* (2020.01)

(56) References Cited

U.S. PATENT DOCUMENTS

| | | | |
|---|---|---|---|
| 2014/0012569 A1* | 1/2014 | Sung | G06F 17/28 |
| | | | 704/9 |
| 2016/0125439 A1* | 5/2016 | Sheppard | G06Q 30/0204 |
| | | | 705/7.33 |
| 2016/0247068 A1 | 8/2016 | Lin | |
| 2018/0336467 A1* | 11/2018 | Guttmann | G06N 20/00 |
| 2019/0114537 A1* | 4/2019 | Wesolowski | G06N 3/10 |
| 2019/0180143 A1* | 6/2019 | Lyu | G06K 9/6256 |
| 2019/0251694 A1* | 8/2019 | Han | G06T 7/11 |
| 2019/0294661 A1* | 9/2019 | Sarkar | G06K 9/00442 |

FOREIGN PATENT DOCUMENTS

| | | |
|---|---|---|
| CN | 104462758 | 3/2015 |
| CN | 104715024 | 6/2015 |
| CN | 104951433 | 9/2015 |
| CN | 105068999 | 11/2015 |
| CN | 105404621 | 3/2016 |
| CN | 106844345 | 6/2017 |

OTHER PUBLICATIONS

Neural Word Segmentation Learning for Chinese Deng Cai and Hai Zhao* Dec. 2, 2016 Department of Computer Science and Engineering Key Lab of Shanghai Education Commission for Intelligent Interaction and Cognitive Engineering.*

Li, "Research on cross-domain and cross-style named entity recognition technology," China Excellent Master's Thesis Full-Text Database Information Technology Series, Issue 8, Aug. 15, 2015, abstract only.

Liu et al., "Research on automatic Chinese word segmentation," International Conference on Machine Learning and Cybernetics, Feb. 2002, vol. 2, abstract only.

Papavassiliou et al., "Handwritten document image segmentation into text lines and words," Pattern Recognition, vol. 43, 2010, pp. 369-377.

Guo, "Research on Technology of Chinese Dependency Parsing," China Excellent Master's Thesis Full-Text Database Information Technology Series, Beijing Jiaotong University, Mar. 2015, abstract only.

SIPO, First Office Action for CN Application No. 201710449945.5, dated Feb. 3, 2020.

* cited by examiner

METHOD FOR MODIFYING SEGMENTATION MODEL BASED ON ARTIFICIAL INTELLIGENCE, DEVICE AND STORAGE MEDIUM

CROSS REFERENCE TO RELATED APPLICATION

This application is based upon and claims priority to Chinese Patent Application Serial No. 201710449945.5, filed with the Status Intellectual Property Office of P. R. China on Jun. 14, 2017, the entire contents of which are incorporated herein by reference.

FIELD

The present disclosure relates to a word segmentation technology field, and more particularly to a method and an apparatus for modifying a segmentation model based on artificial intelligence, a device and a storage medium.

BACKGROUND

Artificial intelligence (AI for short) is a new technology and science for studying and developing theories, methods, technologies and application systems for simulating, extending and expanding human intelligence. AI is a branch of computer science, intending to know essence of intelligence and to produce an intelligent machine able to act in a way similar to that of human intelligence. Researches on the AI field refer to robots, speech recognition, image recognition, natural language processing and expert systems etc.

Chinese word segmentation means segmenting a sequence of Chinese characters into separate words. The Chinese word segmentation is a basis of text mining. When the Chinese word segmentation is performed successfully on a text sequence input into a computer, the computer may recognize a meaning of the text sequence automatically.

An existing segmentation model is generally based on statistics or based on a dictionary, leading to poor generalization ability. Even for a supervised segmentation model based on statistics having certain generalization ability, as there are few manually annotated corpuses, the segmentation model is small, such that a generalization error may occur easily. In prior art, the segmentation model having certain generalization ability may be acquired by using a method of re-training the segmentation model using a generalized feature vector.

It is time and energy consuming to re-train the segmentation model, and the quality of word segmentation is difficult to be ensured.

SUMMARY

Accordingly, embodiments of the present disclosure provide a method and an apparatus for modifying a segmentation model based on artificial intelligence, a device and a storage medium.

In a first aspect, embodiments of the present disclosure provide a method for modifying a segmentation model based on artificial intelligence. The method may include: acquiring a model parameter of the segmentation model, and performing a training on a feature vector corresponding to a preset generalized feature of a first training corpus via a neural network so as to acquire a model parameter of the preset generalized feature; performing a word segmentation on the first training corpus according to the model parameter of the segmentation model and the model parameter of the preset generalized feature, so as to acquire a segmentation result; and comparing the segmentation result with the first training corpus according to a preset rule, and modifying the model parameter of the segmentation model and a parameter of the neural network according to a comparison result.

In a second aspect, embodiments of the present disclosure provide an apparatus for modifying a segmentation model based on artificial intelligence. The apparatus may include: a model parameter acquiring module, configured to acquire a model parameter of the segmentation model, and to perform a training on a feature vector corresponding to a preset generalized feature of a first training corpus via a neural network so as to acquire a model parameter of the preset generalized feature; a segmentation processing module, configured to perform a word segmentation on the first training corpus according to the model parameter of the segmentation model and the model parameter of the preset generalized feature, so as to acquire a segmentation result; and a model parameter modifying module, configured to compare the segmentation result with the first training corpus according to a preset rule, and to modify the model parameter of the segmentation model and a parameter of the neural network according to a comparison result.

In a third aspect, embodiments of the present disclosure provide a device. The device may include one or more processors and a memory configured to store one or more programs, in which, when the one or more programs are executed by the one or more processors, the one or more processors are configured to execute the method for modifying a segmentation model based on artificial intelligence according to embodiments of the present disclosure.

In a fourth aspect, embodiments of the present disclosure provide a computer readable storage medium including computer programs stored thereon, in which, when the computer programs are executed by a processor, the method for modifying a segmentation model based on artificial intelligence according to embodiments of the present disclosure is performed.

DETAILED DESCRIPTION

Figure 1:
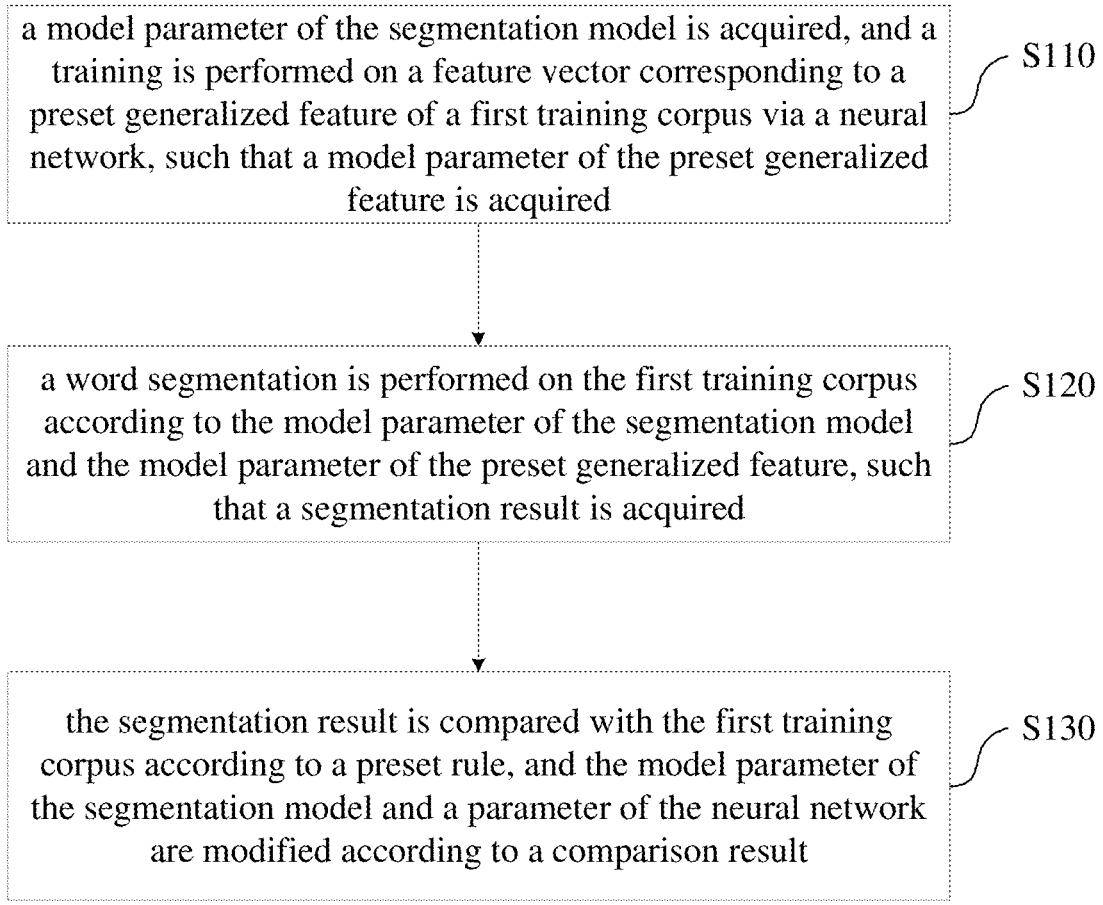
FIG. 1 is a flow chart of a method for modifying a segmentation model based on artificial intelligence according to a first embodiment of the present disclosure.

For a clear description of objectives, technical solutions and advantageous of the present disclosure, reference will be made in detail to describe embodiments of the present disclosure. It should be noted that, the embodiments described herein with reference to drawings are used to generally explain the present disclosure, rather than limiting the present disclosure.

In addition, it should also be noted that, for convenience of the description, the accompany drawings illustrate parts rather than all contents relative to the present disclosure. Before the exemplary embodiments are described in detail, it should be noted that some exemplary embodiments are described as processing or method in a form of a flow chart. Although the operations (or steps) illustrated in the flow chart are described as a processing in a certain order, some operations can be performed concurrently, concomitantly or simultaneously. In addition, the order of the operations may be re-arranged. When the operations have been accomplished, the processing may be finished. Additional steps or acts which are not illustrated in the drawings may be included. The processing may correspond to a method, a function, a regulation, a subroutine, a subprogram and the like.

First Embodiment

FIG. 1 is a flow chart of a method for modifying a segmentation model based on artificial intelligence according to the first embodiment of the present disclosure. The method according to this embodiment may be performed by an apparatus for modifying a segmentation model based on artificial intelligence. The apparatus may be realized in a form of hardware/software and integrated in a device. The method may include followings.

At block 110, a model parameter of the segmentation model is acquired, and a training is performed on a feature vector corresponding to a preset generalized feature of a first training corpus via a neural network, such that a model parameter of the preset generalized feature is acquired.

In this embodiment, the segmentation model may refer to a model configured to perform a word segmentation on a text.

In this embodiment, the first training corpus may refer to a manually annotated training corpus and the like.

In this embodiment, the preset generalized feature may refer to a generalized feature including a statistical term vector feature, a phrase statistical feature, a dictionary term vector feature and the like.

The statistical term vector feature may refer to term vector features acquired by training massive corpuses using a term vector tool. Typical statistical term vector feature may include: a two-word statistical term vector feature or a three-word statistical term vector feature and the like. The number of dimensions of the statistical term vector feature may be 50 etc. The phrase statistical feature may refer to a frequency, a left adjacent entropy, a right adjacent entropy, a left adjacent number, a right adjacent number, pointwise mutual information and the like of a phrase. Typical phrase statistical feature may include: a two-word phrase statistical feature or a three-word phrase statistical feature and the like. The dictionary term vector feature may refer to a phrase feature vector generated using a dictionary. Typical dictionary term vector feature may include a two-word dictionary term vector feature or a three-word dictionary term vector feature and the like.

In this embodiment, one kind of generalized feature may be selected as the preset generalized feature. Alternatively, various kinds of generalized features may be selected simultaneously as the preset generalized feature. In a specific example, when one kind of generalized feature is selected as the preset generalized feature, the number of dimensions of the corresponding feature vector is 50; when two kinds of generalized features are selected as the preset generalized feature, the number of dimensions of the corresponding feature vector is 55. In other words, when the number of the generalized features selected increases, the number of the dimensions of the corresponding feature vector does not fold-increase. Instead, a new feature vector may be generated by merging the feature vector corresponding to the added generalized feature and the feature vector of the original preset generalized feature.

In this embodiment, an initial value of the parameter of the neural network may be set randomly. The feature vector of the preset generalized feature is inputted into an input layer of the neural network. The neural network may compute the model parameter of the preset generalized feature corresponding to the feature vector of the preset generalized feature according to the inputted feature vector of the preset generalized feature, connecting weights between internal nodes and an offset of each internal node and the like. As this process belongs to the prior art, it will not be described in detail herein.

At block 120, a word segmentation is performed on the first training corpus according to the model parameter of the segmentation model and the model parameter of the preset generalized feature, such that a segmentation result is acquired.

In this embodiment, the method for performing the word segmentation on the first training corpus may include: extracting a first transfer matrix from the model parameter of the segmentation model, and acquiring an emission matrix according to the model parameter of the segmentation model and the first training corpus; acquiring a second emission matrix and a second transfer matrix according to the model parameter of the preset generalized feature, in which the second transfer matrix is acquired by modifying the first transfer matrix; performing a summation on the first emission matrix and the second emission matrix, so as to generate the third emission matrix; and performing a Marcov decoding operation on the third emission matrix and the second transfer matrix, so as to acquire the segmentation result.

At block 130, the segmentation result is compared with the first training corpus according to a preset rule, and the model parameter of the segmentation model and a parameter of the neural network are modified according to a comparison result.

In this embodiment, the preset rule may be a stochastic gradient descent algorithm and the like. Specifically, block 130 may further include: comparing the segmentation result with the first training corpus using the stochastic gradient descent algorithm, so as to acquire optimized information, and modifying the model parameter of the segmentation model and the parameter of the neural network according to the optimized information. This process belongs to prior art, which will not be described in detail herein.

The first embodiment of the present disclosure discloses a method for modifying a segmentation model based on artificial intelligence. A model parameter of the segmentation model is acquired, and a training is performed on a feature vector corresponding to a preset generalized feature of a first training corpus via a neural network, such that a model parameter of the preset generalized feature is acquired. Then, a word segmentation is performed on the first training corpus according to the model parameter of the segmentation model and the model parameter of the preset generalized feature, such that a segmentation result is acquired. Finally, the segmentation result is compared with the first training corpus according to a preset rule, and the model parameter of the segmentation model and a parameter of the neural network are modified according to a comparison result. In this way, the problems including time and energy consumption and difficulty of ensuring quality of word segmentation when improving generalization ability of the segmentation model in prior art are solved, and a generalization ability of an existing segmentation model can be expanded simply and rapidly and the segmentation result having the generalization performance can be acquired precisely. Meanwhile, the existing segmentation model may be modified according to the segmentation result having the generalization performance, such that an accuracy of the model parameter of the existing segmentation model is improved.

Second Embodiment

Figure 2:
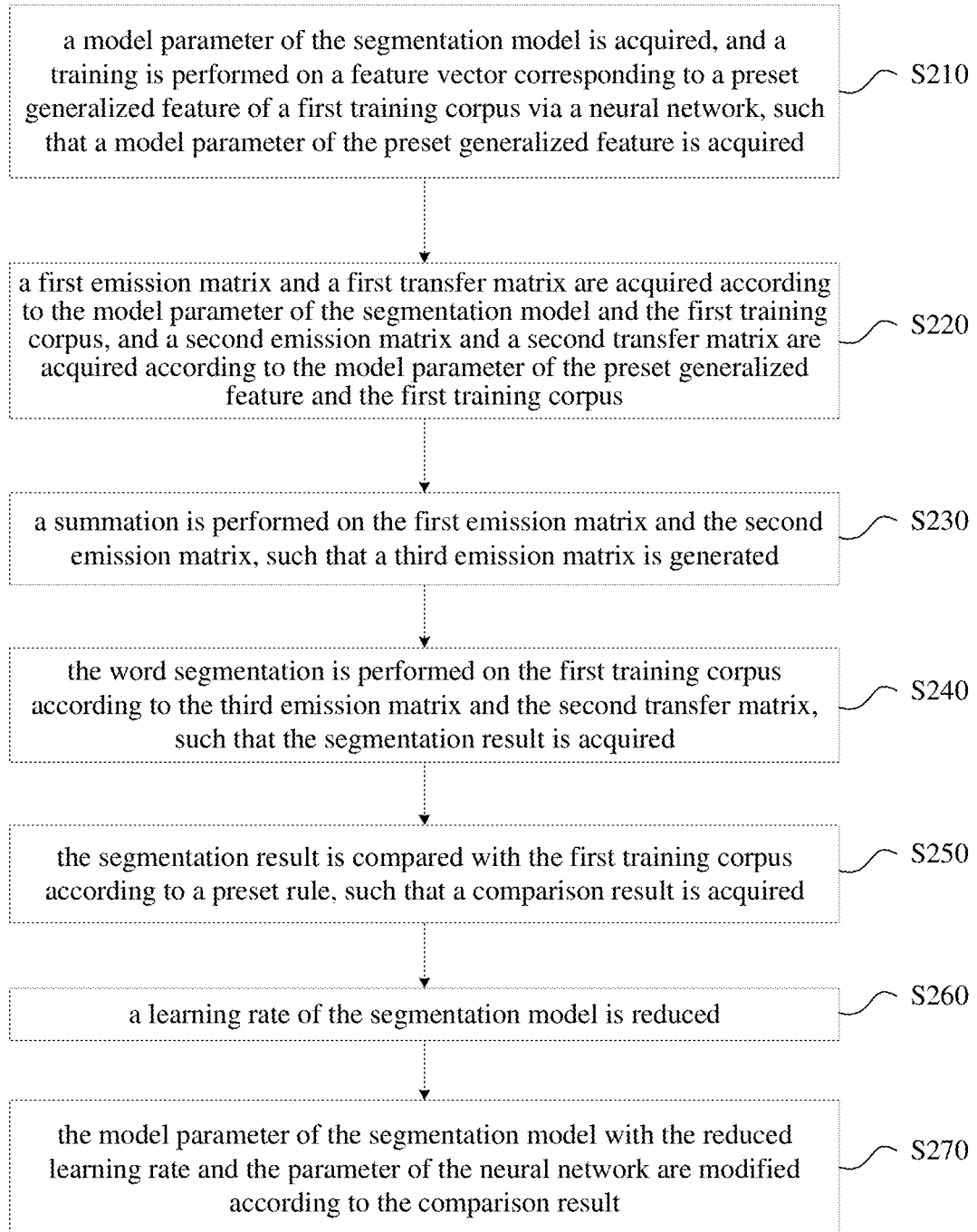
FIG. 2 is a flow chart of a method for modifying a segmentation model based on artificial intelligence according to a second embodiment of the present disclosure.

FIG. 2 is a flow chart of a method for modifying a segmentation model based on artificial intelligence according to a second embodiment of the present disclosure. This embodiment is an optimized solution based on the above embodiment. In this embodiment, performing the word segmentation on the first training corpus according to the model parameter of the segmentation model and the model parameter of the preset generalized feature, so as to acquire the segmentation result may include: acquiring a first emission matrix and a first transfer matrix according to the model parameter of the segmentation model and the first training corpus, and acquiring a second emission matrix and a second transfer matrix according to the model parameter of the preset generalized feature and the first training corpus; generating a third emission matrix according to the first emission matrix and the second emission matrix; and performing the word segmentation on the first training corpus according to the third emission matrix and the second transfer matrix, so as to acquire the segmentation result.

Further, generating the third emission matrix according to the first emission matrix and the second emission matrix may include: performing a summation on the first emission matrix and the second emission matrix, so as to generate the third emission matrix.

Further, comparing the segmentation result with the first training corpus according to the preset rule, and modifying the model parameter of the segmentation model and the parameter of the neural network according to the comparison result may include: comparing the segmentation result with the first training corpus according to the preset rule, so as to acquire the comparison result; reducing a learning rate of the segmentation model; and modifying the model parameter of the segmentation model with the reduced learning rate and the parameter of the neural network according to the comparison result.

Accordingly, the method according to this embodiment may include followings.

At block 210, a model parameter of the segmentation model is acquired, and a training is performed on a feature vector corresponding to a preset generalized feature of a first training corpus via a neural network, such that a model parameter of the preset generalized feature is acquired.

At block 220, a first emission matrix and a first transfer matrix are acquired according to the model parameter of the segmentation model and the first training corpus, and a second emission matrix and a second transfer matrix are acquired according to the model parameter of the preset generalized feature and the first training corpus.

In this embodiment, the first transfer matrix may be extracted directly from the model parameter of the segmentation model, the first transfer matrix may be a 4×4 matrix, values in the matrix represent transition possibilities between Chinese labels. The Chinese labels may include a head word, an intermediate word, a trailing word and a single word phrase. In the first transfer matrix, four rows represent the head word, the intermediate word, the trailing word and the single word phrase respectively from top to bottom, and four columns represent the head word, the intermediate word, the trailing word and the single word phrase respectively from left to right. For example, the value in Row 1, Column 3 represents a possibility of transitioning from the "head word" to the "trailing word".

In this embodiment, the first emission matrix is generated according to the model parameter of the segmentation model and the first training corpus. The first emission matrix includes four rows and n columns, in which the four rows represent the head word, the intermediate word, the trailing word and the single word phrase respectively from top to bottom, and n columns respectively represent the first word, the second word . . . and the last word in a sentence to be segmented from left to right. The sentence to be segmented is included in the first training corpus. Generally, in the process of performing the word segmentation on the corpus to be segmented by the segmentation model, the contents are segmented at several times, rather than at a time, such that the amount of data included in the emission matrix may be reduced in the word segmentation process, thereby reducing a space usage of the memory. For example, one or more rows in the corpus to be segmented may be segmented each time.

Similarly, in this embodiment, the second emission matrix is generated according to the model parameter of the preset generalized feature and the first training corpus. The second emission matrix may include four rows and n columns, in which the four rows represent the head word, the intermediate word, the trailing word and the single word phrase respectively from top to bottom, and n columns respectively represent the first word, the second word . . . and the last word in a sentence to be segmented from left to right. The sentence to be segmented is included in the first training corpus.

In this embodiment, the second transfer matrix is acquired by modifying the first transfer matrix according to the model parameter of the preset generalized feature.

At block 230, a summation is performed on the first emission matrix and the second emission matrix to generate a third emission matrix.

In this embodiment, values in the first emission matrix and values in the second emission matrix are added correspondingly, such that the third emission matrix is generated.

At block 240, the word segmentation is performed on the first training corpus according to the third emission matrix and the second transfer matrix, such that the segmentation result is acquired.

In this embodiment, a Marcov decoding operation is performed on the third emission matrix and the second transfer matrix, such that a first segmentation result is acquired. This process belongs to prior art, which is not described in detail herein.

At block 250, the segmentation result is compared with the first training corpus according to a preset rule, such that a comparison result is acquired.

At block 260, a learning rate of the segmentation model is reduced.

Generally, one parameter of model parameters of the segmentation model may represent the learning rate of the segmentation model. The greater the value of this parameter is, the greater the value for modifying a word of the model parameter is in each learning process of the segmentation model.

In this embodiment, reducing the learning rate of the segmentation model may include reducing the value of the parameter representing the learning rate in the segmentation model. Typically, the learning rate may be reduced to one fifth or one tenth and the like of the original value.

At block 270, the model parameter of the segmentation model with the reduced learning rate and the parameter of the neural network are modified according to the comparison result.

The second embodiment of the present disclosure discloses a method for modifying a segmentation model based on artificial intelligence, in which the process of performing the word segmentation on the first training corpus is described in detail, and an accurate segmentation result can be acquired. Meanwhile, the process of modifying the model parameter is described in detail, a change amount of the model parameter can be reduced by reducing the learning rate of the segmentation model. With this method, the third emission matrix and the second transfer matrix each having certain generalization ability are generated, such that the accuracy of the segmentation result of the first training corpus can be improved. At the same time, an influence degree of the model parameter of the segmentation model corresponding to the generalized feature can be controlled reasonably, and a redundancy problem in the word segmentation can be solved by selecting the generalized feature.

Third Embodiment

Figure 3:
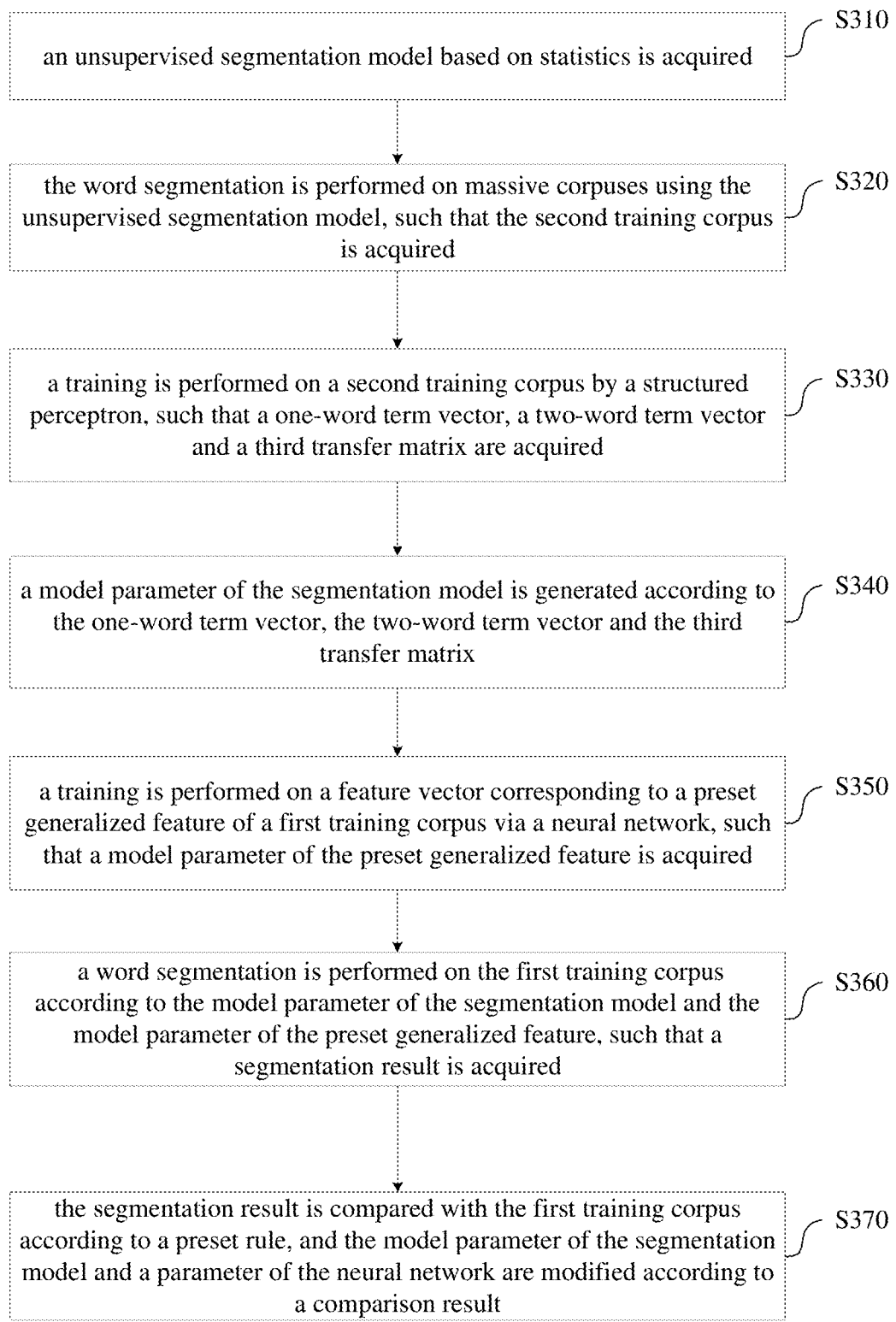
FIG. 3 is a flow chart of a method for modifying a segmentation model based on artificial intelligence according to a third embodiment of the present disclosure.

FIG. 3 is a flow chart of a method for modifying a segmentation model based on artificial intelligence according to the third embodiment of the present disclosure. This embodiment is an optimized solution based on the above embodiments. In this embodiment, acquiring the model parameter of the segmentation model may include: performing the training on a second training corpus by a structured perceptron, so as to acquire a one-word term vector, a two-word term vector and a third transfer matrix; and generating the model parameter of the segmentation model according to the one-word term vector, the two-word term vector and the third transfer matrix.

Further, before the training is performed on the second training corpus by the structured perceptron so as to acquire the one-word term vector, the two-word term vector and the third transfer matrix, the method may also include: acquiring an unsupervised segmentation model based on statistics; and performing the word segmentation on a plurality of corpuses using the unsupervised segmentation model, so as to acquire the second training corpus.

Accordingly, the method according to this embodiment may include followings.

At block 310, an unsupervised segmentation model based on statistics is acquired.

In this embodiment, the second training corpus may be acquired at block 310 and block 320. The segmentation model for generating the second training corpus may be acquired firstly. In this embodiment, the unsupervised segmentation model based on statistics is acquired. In addition, in this embodiment, other segmentation models having high word segmentation accuracy can also be acquired.

At block 320, the word segmentation is performed on massive corpuses using the unsupervised segmentation model, such that the second training corpus is acquired.

In this embodiment, the massive corpuses may refer to a common text, for example, a news text, a novel text and the like, excluding a text in a professional field.

At block 330, a training is performed on a second training corpus by a structured perceptron, such that a one-word term vector, a two-word term vector and a third transfer matrix are acquired.

In this embodiment, the one-word term vector, which refers to a term vector of a single word term existing in the second training corpus, may typically be a 12 dimensional one-word term vector. The two-word term vector, which refers to a term vector of a two-word phase existing in the second training corpus, may typically be a 16 dimensional two-word term vector.

In a specific example, the 12 dimensional one-word term vector of the Chinese character "我 (I)" is [A1 A2 A3 A4 A5 A6 A7 A8 A9 A10 A11 A12], in which A1 to A4 represent weights of the label of a character in front of the character "我" being the head word, the intermediate word, the trailing word and the single word phrase respectively in the second training corpus, A5 to A8 represent weights of the label of the character "我" being the head word, the intermediate word, the trailing word and the single word phrase respectively in the second training corpus, and A9 to A12 represent weights of the label of a character behind the character "我" being the head word, the intermediate word, the trailing word and the single word phrase respectively in the second training corpus.

In a specific example, the 16 dimensional two-word term vector of the phrase "喜欢 (like)" is [B1 B2 B3 B4 B5 B6 B7 B8 B9 B10 B11 B12 B13 B14 B15 B16], in which B1 to B4 represent weights of the label of a character in front of the phrase "喜欢" being the head word, the intermediate word, the trailing word and the single word phrase respectively in the second training corpus, B5 to B8 represent weights of the label of the character "喜" in the phrase "喜欢" being the head word, the intermediate word, the trailing word and the single word phrase respectively in the second training corpus, B9 to B12 represent weights of the label of character "欢" in the phrase "喜欢" being the head word, the intermediate word, the trailing word and the single word phrase respectively in the second training corpus, and B13 to B16 represent weights of the label of a character behind the phrase "喜欢" being the head word, the intermediate word, the trailing word and the single word phrase respectively in the second training corpus.

It would be appreciated by those skilled in the art that, by using the structured perceptron to train the corpus, not only the one-word term vector and the two-word term vector may be acquired, but also a multiword term vector such as three-word term vector, four-word term vector and the like may be acquired. As the emission matrix corresponding to the term vector is generated by reference to all values of the term vector, if there are too many term vectors, the processing speed may be reduced dramatically. Therefore, in this embodiment, in a case of taking an overall consideration of a computing speed and computing accuracy, only the one-word term vector and the two-word term vector are generated to perform the word segmentation.

In this embodiment, at the same time of training the second training corpus using the structured perceptron to acquire the one-word term vector and the two-word term vector, the third transfer matrix may be acquired. The third transfer matrix may be a 4×4 matrix, values in the matrix represent transition possibilities between Chinese labels. The Chinese labels may include a head word, an intermediate word, a trailing word and a single word phrase, represented by b, m, e and s respectively. Four rows in the third transfer matrix represent the head word, the intermediate word, the trailing word and the single word phrase respectively from top to bottom, and four columns represent the head word, the intermediate word, the trailing word and the single word phrase respectively from left to right. For example, the value in Row 2, Column 4 in the third transfer matrix represents a possibility of transitioning from the "intermediate word" to the "single word phrase".

At block 340, a model parameter of the segmentation model is generated according to the one-word term vector, the two-word term vector and the third transfer matrix.

In this embodiment, the one-word term vector, the two-word term vector and the third transfer matrix together constitute the model parameter of the segmentation model.

At block 350, a training is performed on a feature vector corresponding to a preset generalized feature of a first training corpus via a neural network, such that a model parameter of the preset generalized feature is acquired.

At block 360, a word segmentation is performed on the first training corpus according to the model parameter of the segmentation model and the model parameter of the preset generalized feature, such that a segmentation result is acquired.

At block 370, the segmentation result is compared with the first training corpus according to a preset rule, and the model parameter of the segmentation model and a parameter of the neural network are modified according to a comparison result.

In this embodiment, modifying the model parameter of the segmentation model according to the comparison result may include: modifying values in the one-word term vector, the two-word term vector and the third transfer matrix generated at block 330.

The third Embodiment of the present disclosure discloses a method for modifying a segmentation model based on artificial intelligence. The method for acquiring the model parameter of the segmentation model is described in detail, and the method for acquiring the second training corpus is optimally added. With the method, a stable and uniform model parameter of the segmentation model can be acquired by training the massive corpuses. Meanwhile, the model parameter of the segmentation model and the parameter of the neural network may be modified continually according to the comparison result, such that the model parameter of the segmentation model and the parameter of the neural network may be reasonable and accuracy of the segmentation result can be improved.

Fourth Embodiment

Figure 4:
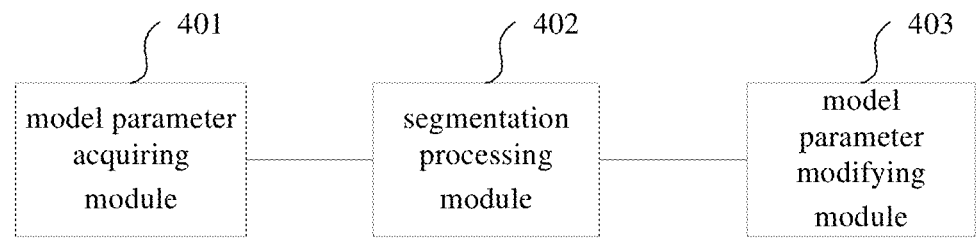
FIG. 4 is a block diagram of an apparatus for modifying a segmentation model based on artificial intelligence according to a fourth embodiment of the present disclosure.

FIG. 4 is a block diagram of an apparatus for modifying a segmentation model based on artificial intelligence according to the fourth embodiment of the present disclosure. As shown in FIG. 4, the apparatus may include: a model parameter acquiring module 401, a segmentation processing module 402 and a model parameter modifying module 403.

The model parameter acquiring module 401 is configured to acquire a model parameter of the segmentation model, and to perform a training on a feature vector corresponding to a preset generalized feature of a first training corpus via a neural network so as to acquire a model parameter of the preset generalized feature.

The segmentation processing module 402 is configured to perform a word segmentation on the first training corpus according to the model parameter of the segmentation model and the model parameter of the preset generalized feature, so as to acquire a segmentation result.

The model parameter modifying module 403 is configured to compare the segmentation result with the first training corpus according to a preset rule, and to modify the model parameter of the segmentation model and a parameter of the neural network according to a comparison result.

The fourth embodiment of the present disclosure provides an apparatus for modifying a segmentation model based on artificial intelligence. A model parameter of the segmentation model is acquired, and a training is performed on a feature vector corresponding to a preset generalized feature of a first training corpus via a neural network, such that a model parameter of the preset generalized feature is acquired. Then, a word segmentation is performed on the first training corpus according to the model parameter of the segmentation model and the model parameter of the preset generalized feature, such that a segmentation result is acquired. Finally, the segmentation result is compared with the first training corpus according to a preset rule, and the model parameter of the segmentation model and a parameter of the neural network are modified according to a comparison result. In this way, the problems including time and energy consumption and difficulty of ensuring quality of word segmentation when improving generalization ability of the segmentation model in prior art are solved, and a generalization ability of an existing segmentation model can be expanded simply and rapidly and the generalized segmentation result having the generalization performance can be acquired precisely. Meanwhile, the existing segmentation model may be modified according to the segmentation result having the generalization performance, such that an accuracy of the model parameter of the existing segmentation model is improved.

Based on the above embodiments, the segmentation processing module may include: a matrix acquiring unit, configured to acquire a first emission matrix and a first transfer matrix according to the model parameter of the segmentation model and the first training corpus, and to acquire a second emission matrix and a second transfer matrix according to the model parameter of the preset generalized feature and the first training corpus; a matrix generating unit, configured to generate a third emission matrix according to the first emission matrix and the second emission matrix; and a segmentation unit, configured to perform the word segmentation on the first training corpus according to the third emission matrix and the second transfer matrix, so as to acquire the segmentation result.

Based on the above embodiments, the matrix generating unit may be further configured to: perform a summation on the first emission matrix and the second emission matrix, so as to generate the third emission matrix.

Based on the above embodiments, the model parameter acquiring module may include: a feature vector acquiring unit, configured to perform the training on a second training corpus by a structured perceptron, so as to acquire a one-word term vector, a two-word term vector and a third transfer matrix; and a segmentation model parameter acquiring unit, configured to generate the model parameter of the segmentation model according to the one-word term vector, the two-word term vector and the third transfer matrix.

Based on the above embodiments, the model parameter acquiring module may further include: a unsupervised segmentation model acquiring unit, configured to acquire an unsupervised segmentation model based on statistics before the training is performed on the second training corpus by the structured perceptron so as to acquire the one-word term vector, the two-word term vector and the third transfer matrix; and a second training corpus acquiring unit, configured to perform the word segmentation on massive corpuses using the unsupervised segmentation model, so as to acquire the second training corpus.

Based on the above embodiments, the model parameter modifying module may include: a result comparing unit, configured to compare the segmentation result with the first training corpus according to the preset rule, so as to acquire the comparison result; a learning rate reducing unit, configured to reduce a learning rate of the segmentation model; and a parameter modifying unit, configured to modify the model parameter of the segmentation model with the reduced learning rate and the parameter of the neural network according to the comparison result.

Based on the above embodiments, the preset generalized feature may include at least one of: a term vector feature, a two-word statistic feature, a three-word statistic feature and a dictionary feature.

The apparatus for modifying a segmentation model based on artificial intelligence provided by embodiments of the present disclosure is used to perform any method for modifying a segmentation model based on artificial intelligence provided by embodiments of the present disclosure. The apparatus has functional modules corresponding to the method, and is able to realize same advantageous effects.

Fifth Embodiment

Figure 5:
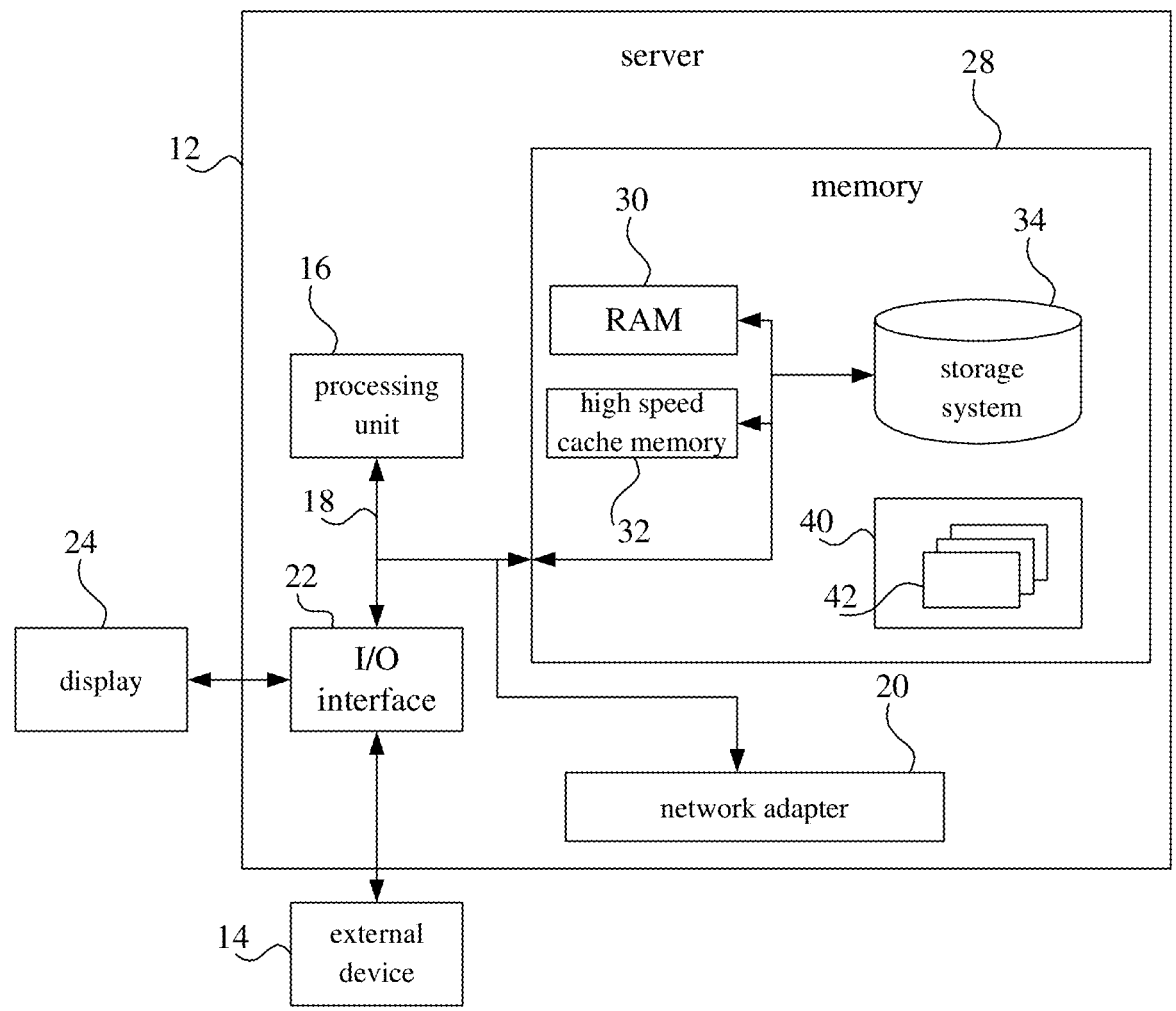
FIG. 5 is a block diagram of a device according to a fifth embodiment of the present disclosure.

FIG. 5 is a structure diagram of a device according to the fifth embodiment of the present disclosure. FIG. 5 illustrates a block diagram of an example device 12 suitable for implementing embodiments of the present disclosure. The device 12 illustrated in FIG. 5 is merely an example, which should be not understood to limit the functions and usage scope of embodiments of the present disclosure.

As illustrated in FIG. 5, the device 12 may be represented in a form of a general-purpose computing device. Components of the device 12 may include but are not limited to one or more processors or processing units 16, a system memory 28, a bus 18 connecting various system components including the system memory 28 and the processing units 16.

The bus 18 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 12 typically includes a variety of computer system readable media. These media may be any available media accessible by the device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), Digital Video Disc Read Only Memory (hereinafter referred to as DVD-ROM) or other optical media can be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The device 12 may also communicate with one or more external devices 14 (such as, a keyboard, a pointing device, a display 24, etc.). Furthermore, the device 12 may also communicate with one or more devices enabling a user to interact with the device 12 and/or other devices (such as a network card, modem, etc.) enabling the device 12 to communicate with one or more computer devices. This communication can be performed via the input/output (I/O) interface 22. Also, the device 12 may communicate with one or more networks (such as a local area network (hereafter referred to as LAN), a wide area network (hereafter referred to as WAN) and/or a public network such as an Internet) through a network adapter 20. As shown in FIG. 5, the network adapter 20 communicates with other modules of the device 12 over the bus 18. It should be understood that, although not shown in FIG. 5, other hardware and/or software modules may be used in connection with the device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the method for modifying a segmentation model based on artificial intelligence provided in embodiments of the present disclosure. the method for modifying a segmentation model based on artificial intelligence may include: acquiring a model parameter of the segmentation model, and performing a training on a feature vector corresponding to a preset generalized feature of a first training corpus via a neural network so as to acquire a model parameter of the preset generalized feature; performing a word segmentation on the first training corpus according to the model parameter of the segmentation model and the model parameter of the preset generalized feature, so as to acquire a segmentation result; and comparing the segmentation result with the first training corpus according to a preset rule, and modifying the model parameter of the segmentation model and a parameter of the neural network according to a comparison result.

Sixth Embodiment

The sixth embodiment of the present disclosure also provides a computer readable storage medium including computer programs stored thereon, in which, when the computer programs are executed by a computer processor, the method for modifying a segmentation model based on artificial intelligence according to embodiments of the present disclosure is performed. The method for modifying a segmentation model based on artificial intelligence may include: acquiring a model parameter of the segmentation model, and performing a training on a feature vector corresponding to a preset generalized feature of a first training corpus via a neural network so as to acquire a model parameter of the preset generalized feature; performing a word segmentation on the first training corpus according to the model parameter of the segmentation model and the model parameter of the preset generalized feature, so as to acquire a segmentation result; and comparing the segmentation result with the first training corpus according to a preset rule, and modifying the model parameter of the segmentation model and a parameter of the neural network according to a comparison result.

Any combination of one or more computer readable medium(s) may be utilized as the computer storage medium according to embodiments of the present disclosure. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by or in connection with an instruction executed system, apparatus or device.

The computer readable signal medium may include a data signal propagating in baseband or as part of a carrier wave which carries a computer readable program code. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport a program used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or device. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that the above descriptions are preferred embodiments and applied technical principles of the present disclosure. It would be appreciated by those skilled in the art that various obvious changes, re-adjustments and replacements can be made in the embodiments without departing from scope of the present disclosure. Therefore, although the present disclosure has been described in detail by above embodiments, the embodiments cannot be construed to limit the present disclosure. Instead, the embodiments of the present disclosure include other equivalents within the spirit and scope of the present disclosure as defined by the claims.

What is claimed is:

1. A method for modifying a segmentation model based on artificial intelligence, comprising:

acquiring a model parameter of the segmentation model, and performing a training on a feature vector corresponding to a preset generalized feature of a first training corpus via a neural network so as to acquire a model parameter of the preset generalized feature;

performing a word segmentation on the first training corpus according to the model parameter of the segmentation model and the model parameter of the preset generalized feature, so as to acquire a segmentation result; and comparing the segmentation result with the first training corpus according to a preset rule, and modifying the model parameter of the segmentation model and a parameter of the neural network according to a comparison result wherein performing the word segmentation on the first training corpus according to the model parameter of the segmentation model and the model parameter of the preset generalized feature, so as to acquire the segmentation result comprises:

acquiring a first emission matrix and a first transfer matrix according to the model parameter of the segmentation model and the first training corpus, and acquiring a second emission matrix and a second transfer matrix according to the model parameter of the preset generalized feature and the first training corpus;

generating a third emission matrix according to the first emission matrix and the second emission matrix; and performing the word segmentation on the first training corpus according to the third emission matrix and the second transfer matrix, so as to acquire the segmentation result.

2. The method according to claim 1, wherein generating the third emission matrix according to the first emission matrix and the second emission matrix comprises:

performing a summation on the first emission matrix and the second emission matrix, so as to generate the third emission matrix.

3. The method according to claim 1, wherein acquiring the model parameter of the segmentation model comprises:

performing the training on a second training corpus by a structured perceptron, so as to acquire a one-word term vector, a two-word term vector and a third transfer matrix; and generating the model parameter of the segmentation model according to the one-word term vector, the two-word term vector and the third transfer matrix.

4. The method according to claim 3, wherein before performing the training on the second training corpus by the structured perceptron so as to acquire the one-word term vector, the two-word term vector and the third transfer matrix, the method comprises:
acquiring an unsupervised segmentation model based on statistics; and
performing the word segmentation on a plurality of corpuses using the unsupervised segmentation model, so as to acquire the second training corpus.

5. The method according to claim 1, wherein comparing the segmentation result with the first training corpus according to the preset rule, and modifying the model parameter of the segmentation model and the parameter of the neural network according to the comparison result comprises:
comparing the segmentation result with the first training corpus according to the preset rule, so as to acquire the comparison result;
reducing a learning rate of the segmentation model; and
modifying the model parameter of the segmentation model with the reduced learning rate and the parameter of the neural network according to the comparison result.

6. The method according to claim 1, wherein the preset generalized feature comprises at least one of: a term vector feature, a two-word statistic feature, a three-word statistic feature and a dictionary feature.

7. A device, comprising:
one or more processors; and
a memory configured to store one or more programs;
wherein,
when the one or more programs are executed by the one or more processors, the one or more processors are configured to execute the method for modifying a segmentation model based on artificial intelligence, comprising:
acquiring a model parameter of the segmentation model, and performing a training on a feature vector corresponding to a preset generalized feature of a first training corpus via a neural network so as to acquire a model parameter of the preset generalized feature;
performing a word segmentation on the first training corpus according to the model parameter of the segmentation model and the model parameter of the preset generalized feature, so as to acquire a segmentation result; and
comparing the segmentation result with the first training corpus according to a preset rule, and modifying the model parameter of the segmentation model and a parameter of the neural network according to a comparison result
wherein performing the word segmentation on the first training corpus according to the model parameter of the segmentation model and the model parameter of the preset generalized feature, so as to acquire the segmentation result comprises:
acquiring a first emission matrix and a first transfer matrix according to the model parameter of the segmentation model and the first training corpus, and acquiring a second emission matrix and a second transfer matrix according to the model parameter of the preset generalized feature and the first training corpus;
generating a third emission matrix according to the first emission matrix and the second emission matrix; and
performing the word segmentation on the first training corpus according to the third emission matrix and the second transfer matrix, so as to acquire the segmentation result.

8. The device according to claim 7, wherein generating the third emission matrix according to the first emission matrix and the second emission matrix comprises:
performing a summation on the first emission matrix and the second emission matrix, so as to generate the third emission matrix.

9. The device according to claim 7, wherein acquiring the model parameter of the segmentation model comprises:
performing the training on a second training corpus by a structured perceptron, so as to acquire a one-word term vector, a two-word term vector and a third transfer matrix; and
generating the model parameter of the segmentation model according to the one-word term vector, the two-word term vector and the third transfer matrix.

10. The device according to claim 9, wherein before performing the training on the second training corpus by the structured perceptron so as to acquire the one-word term vector, the two-word term vector and the third transfer matrix, the method comprises:
acquiring an unsupervised segmentation model based on statistics; and
performing the word segmentation on a plurality of corpuses using the unsupervised segmentation model, so as to acquire the second training corpus.

11. The device according to claim 7, wherein comparing the segmentation result with the first training corpus according to the preset rule, and modifying the model parameter of the segmentation model and the parameter of the neural network according to the comparison result comprises:
comparing the segmentation result with the first training corpus according to the preset rule, so as to acquire the comparison result;
reducing a learning rate of the segmentation model; and
modifying the model parameter of the segmentation model with the reduced learning rate and the parameter of the neural network according to the comparison result.

12. The device according to claim 7, wherein the preset generalized feature comprises at least one of: a term vector feature, a two-word statistic feature, a three-word statistic feature and a dictionary feature.

13. A non-transitory computer readable storage medium comprising computer programs stored thereon, wherein when the computer programs are executed by a processor, the method for modifying a segmentation model based on artificial intelligence, comprising:
acquiring a model parameter of the segmentation model, and performing a training on a feature vector corresponding to a preset generalized feature of a first training corpus via a neural network so as to acquire a model parameter of the preset generalized feature;
performing a word segmentation on the first training corpus according to the model parameter of the segmentation model and the model parameter of the preset generalized feature, so as to acquire a segmentation result; and
comparing the segmentation result with the first training corpus according to a preset rule, and modifying the model parameter of the segmentation model and a parameter of the neural network according to a comparison result wherein performing the word segmentation on the first training corpus according to the model parameter of the segmentation model and the model parameter of the preset generalized feature, so as to acquire the segmentation result comprises:

acquiring a first emission matrix and a first transfer matrix according to the model parameter of the segmentation model and the first training corpus, and acquiring a second emission matrix and a second transfer matrix according to the model parameter of the preset generalized feature and the first training corpus;

generating a third emission matrix according to the first emission matrix and the second emission matrix; and performing the word segmentation on the first training corpus according to the third emission matrix and the second transfer matrix, so as to acquire the segmentation result.

14. The non-transitory computer readable storage medium according to claim 13, wherein generating the third emission matrix according to the first emission matrix and the second emission matrix comprises:

performing a summation on the first emission matrix and the second emission matrix, so as to generate the third emission matrix.

15. The non-transitory computer readable storage medium according to claim 13, wherein acquiring the model parameter of the segmentation model comprises:

performing the training on a second training corpus by a structured perceptron, so as to acquire a one-word term vector, a two-word term vector and a third transfer matrix; and generating the model parameter of the segmentation model according to the one-word term vector, the two-word term vector and the third transfer matrix.

16. The non-transitory computer readable storage medium according to claim 15, wherein before performing the training on the second training corpus by the structured perceptron so as to acquire the one-word term vector, the two-word term vector and the third transfer matrix, the method comprises:

acquiring an unsupervised segmentation model based on statistics; and performing the word segmentation on a plurality of corpuses using the unsupervised segmentation model, so as to acquire the second training corpus.

17. The non-transitory computer readable storage medium according to claim 13, wherein comparing the segmentation result with the first training corpus according to the preset rule, and modifying the model parameter of the segmentation model and the parameter of the neural network according to the comparison result comprises:

comparing the segmentation result with the first training corpus according to the preset rule, so as to acquire the comparison result;

reducing a learning rate of the segmentation model; and modifying the model parameter of the segmentation model with the reduced learning rate and the parameter of the neural network according to the comparison result.

18. The non-transitory computer readable storage medium according to claim 13, wherein the preset generalized feature comprises at least one of: a term vector feature, a two-word statistic feature, a three-word statistic feature and a dictionary feature.

* * * * *